Sept. 10, 1957     E. R. BERGMANN     2,805,751
CRAWLER SHAKER CONVEYOR
Filed Jan. 4, 1954     7 Sheets-Sheet 1
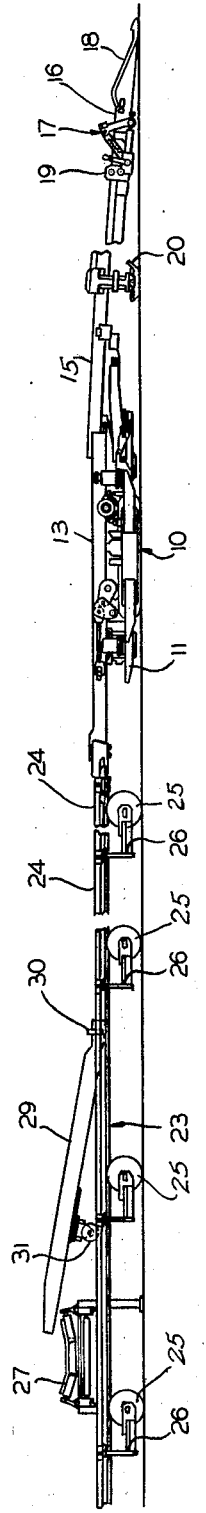
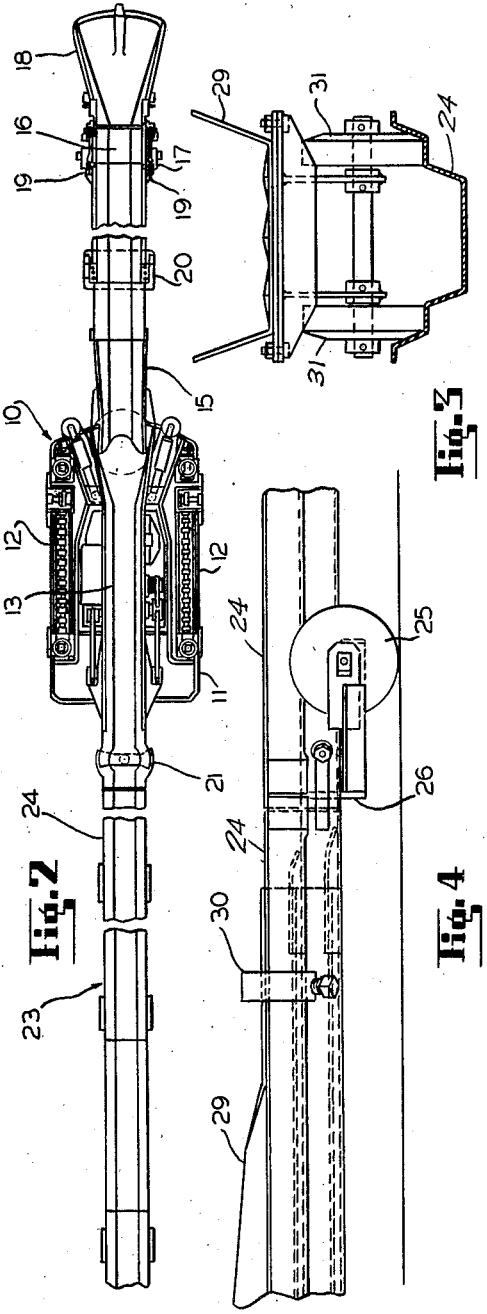
*INVENTOR.*
ERNST R. BERGMANN
BY
*Murray A. Gleeson*
ATTORNEY

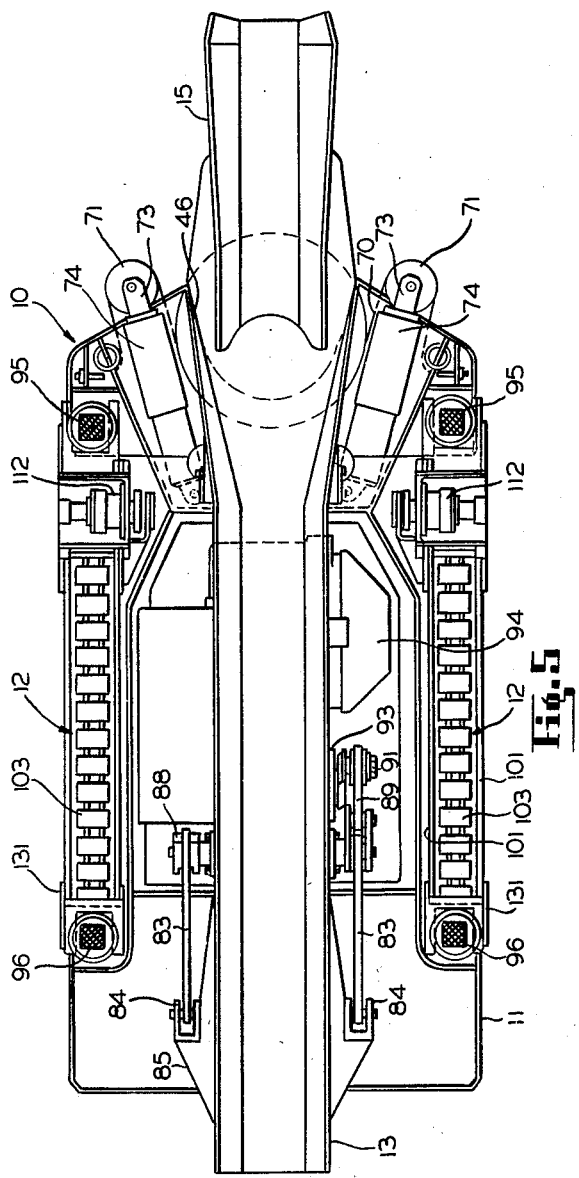

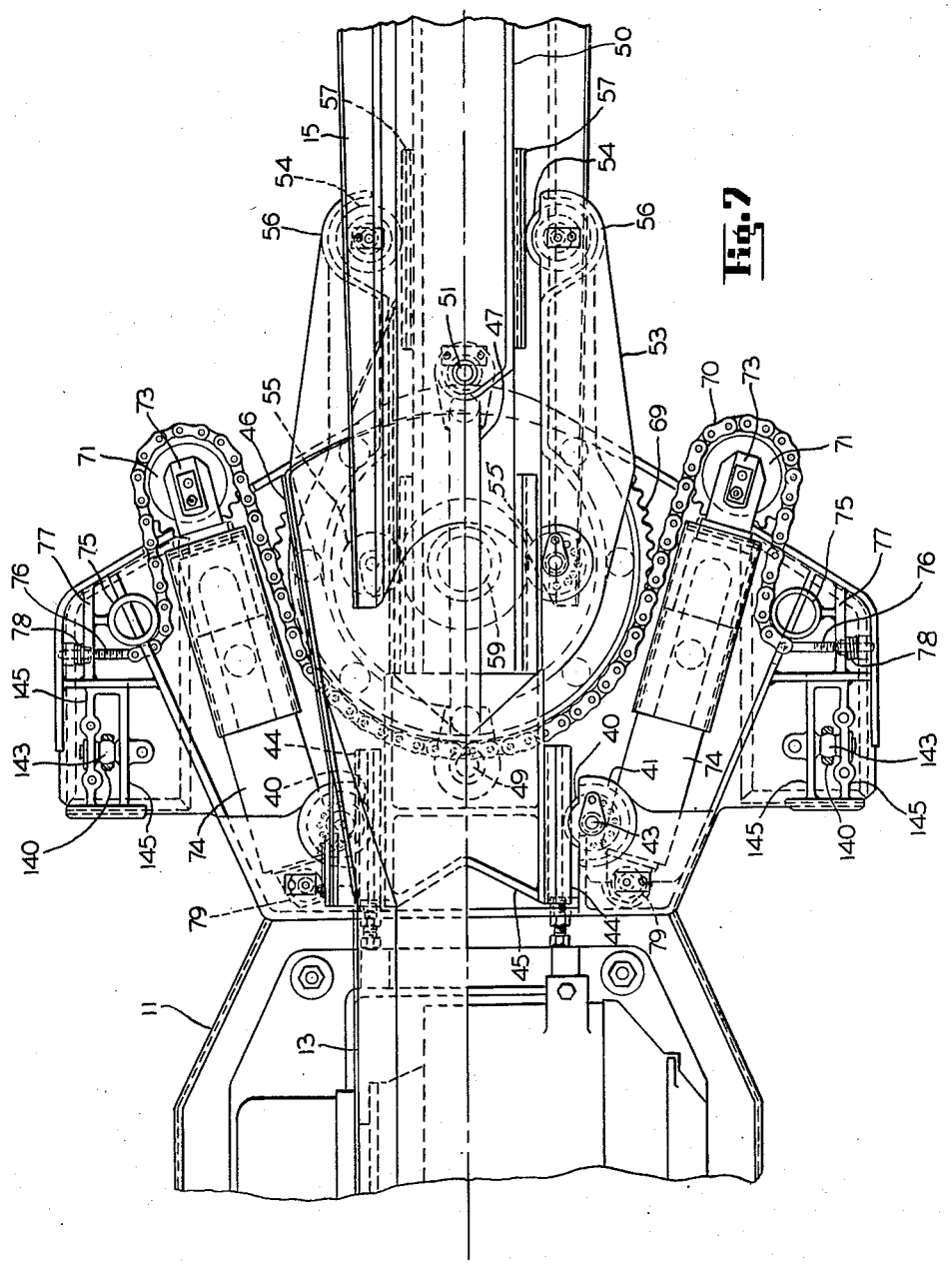

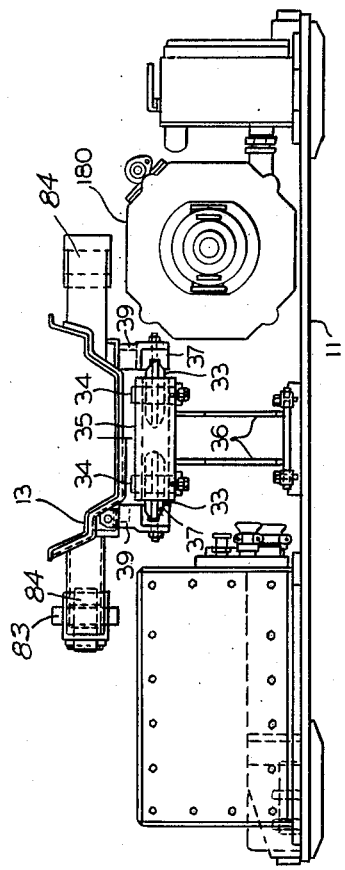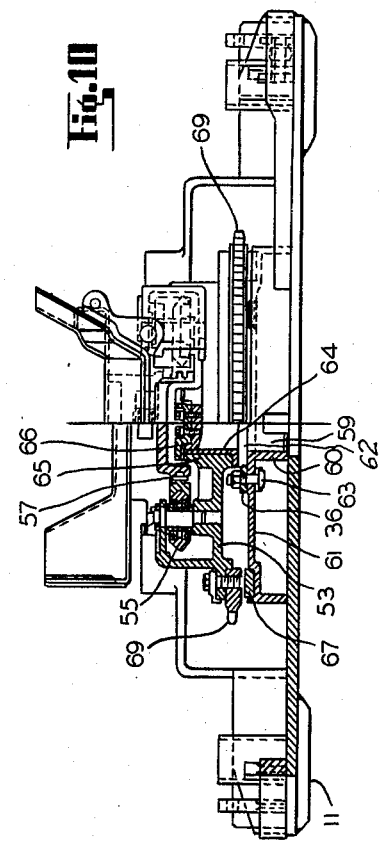

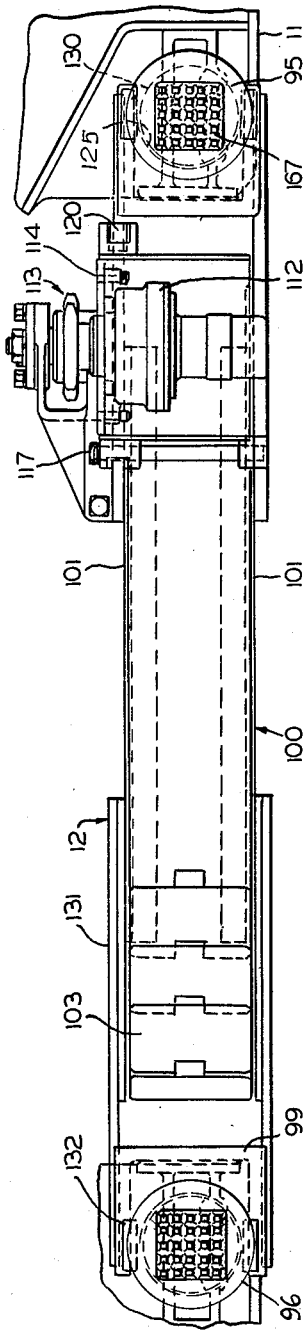

Sept. 10, 1957     E. R. BERGMANN     2,805,751
CRAWLER SHAKER CONVEYOR

Filed Jan. 4, 1954     7 Sheets-Sheet 7

INVENTOR.
ERNST R. BERGMANN
BY
Murray A. Gleeson
ATTORNEY 2,805,751

CRAWLER SHAKER CONVEYOR

Ernst R. Bergmann, Evergreen Park, Ill., assignor to Goodman Manufacturing Company, Chicago, Ill., a corporation of Illinois Application January 4, 1954, Serial No. 401,824

18 Claims. (Cl. 198—14)

This invention relates to improvements in conveyor loading devices and more particularly relates to such devices for continuously loading from the working face of a mine and transferring the loaded material to a main gathering conveyor remote from the working face.

A principal object of my invention is to provide a novel and improved form of conveyor loading device arranged with a view toward continuously loading out a working place of low height in a more expeditious manner than formerly.

Another object of my invention is to provide a loading device of the shaker conveyor type wherein a mobile drive unit for the conveyor trough line is positioned adjacent the working face and serves to advance the loading device and transport the same about the mine and is arranged to be positively jacked in position in engagement with the ground during loading.

Still another object of my invention is to provide a mobile conveyor loading device propelled by laterally spaced continuous traction tread devices and having a base floatingly carried on the continuous tread devices and engaged with the ground, free from the traction treads during loading.

Still another object of my invention is to provide a mobile conveyor loading device having a base engageable with the ground during loading and having independently driven unitary traction tread devices for transporting the device, together with a simplified and novel form of floating supporting connection between the traction tread devices and the base, having engaging supporting connection with the traction tread devices for maintaining the base in spaced relation with respect to the ground during transportation, and positively engaging the base with the ground free from the traction tread devices during loading.

Still another object of my invention is to provide a novel and improved form of transporting and support means for a base particularly adapted to form the base of a shaker conveyor loading device including unitary traction tread devices each driven by individual motors forming a part thereof, and roof jacks supportingly engaged thereby, and having pivotal connection with the base for elevating the same above the ground and supporting the base on the traction tread devices during transportation and for engaging the base with the ground and coming into engagement with the mine roof during loading, for positively holding the base in position on the ground and relieving the traction tread devices from strains during the loading operation.

A still further and more detailed object of my invention is to provide a mobile loading unit having a floating base supported on laterally spaced continuous traction tread devices in spaced relation with respect to the ground during transportation, and positively held in engagement with the ground free from the traction tread devices during loading, and having drive mechanism thereon and a reciprocating pick-up trough extending therefrom reciprocably driven by the drive mechanism, with power means on the base for laterally moving the pick-up trough to pick-up loose material from remote places along the working place.

Still another object of my invention is to provide a mobile shaker conveyor loading unit having a base forming a support for the drive mechanism for the unit, with a pick-up trough projecting forwardly from the base and driven therefrom and laterally moved with respect thereto by self-contained power operated mechanism on the base, and having a wheel supported discharge trough line extending rearwardly from the base and driven from the drive mechanism on the base.

A further object of my invention is to provide a mobile shaker conveyor loading unit for loading directly onto a cross gathering conveyor, wherein a shaker conveyor trough line is driven from drive mechanism on a mobile base adjacent the working face, and a simplified form of transfer pan is provided to transfer material directly from the trough line onto the cross conveyor, regardless of the position of the conveyor with respect to the shaker conveyor.

Still another object of my invention is to provide a shaker conveyor loading device having a wheel supported conveyor trough line driven at the in-by end of the trough line, and accommodating extension of the trough line from the out-by end thereof, and thus avoiding the necessity of transporting additional troughs to extend the trough line to the working face.

These and other objects of my invention will appear from time to time as the following specification proceeds and with reference to the accompanying drawings wherein:

Figure 1 is a view in side elevation of a mobile loading unit constructed in accordance with my invention, showing the unit discharging into a cross gathering conveyor at an intermediate position along the loading unit;

Figure 2 is a fragmentary plan view of the loading unit shown in Figure 1 drawn to a slightly enlarged scale;

Figure 3 is an enlarged fragmentary detail view showing the connection of the transfer trough to the conveyor trough line;

Figure 4 is a transverse sectional view taken through the transfer trough and conveyor trough line;

Figure 5 is an enlarged plan view of the mobile drive unit for the loading device;

Figure 6 is a view in side elevation of the device shown in Figure 5;

Figure 7 is an enlarged fragmentary plan view of the front end portion of the mobile drive unit with the drive trough therefor and traction tread devices removed;

Figure 9 is an end view of the drive unit looking toward the unit from the out-by end thereof;

Figure 10 is a partial fragmentary front end view of the drive unit and showing certain parts thereof in transverse section;

Figure 11 is a plan view of one of the traction tread devices;

Figure 12 is a view in side elevation of the traction tread device shown in Figure 11;

Figure 8:
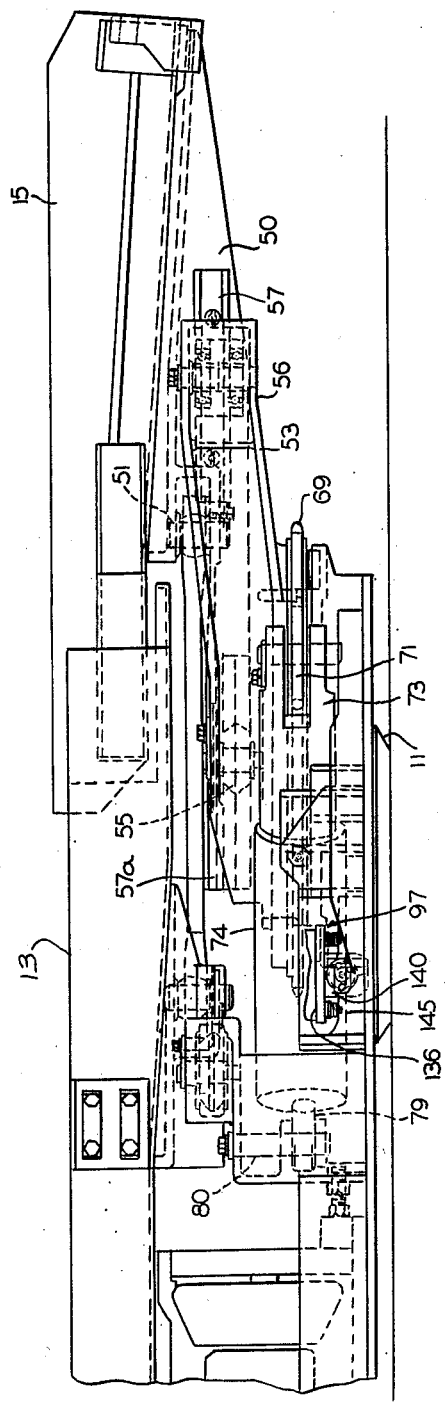
Figure 8 is a fragmentary view in side elevation of the front end portion of the mobile drive unit drawn to substantially the same scale as Figure 7, with the traction tread devices therefor removed.
Figure 13:
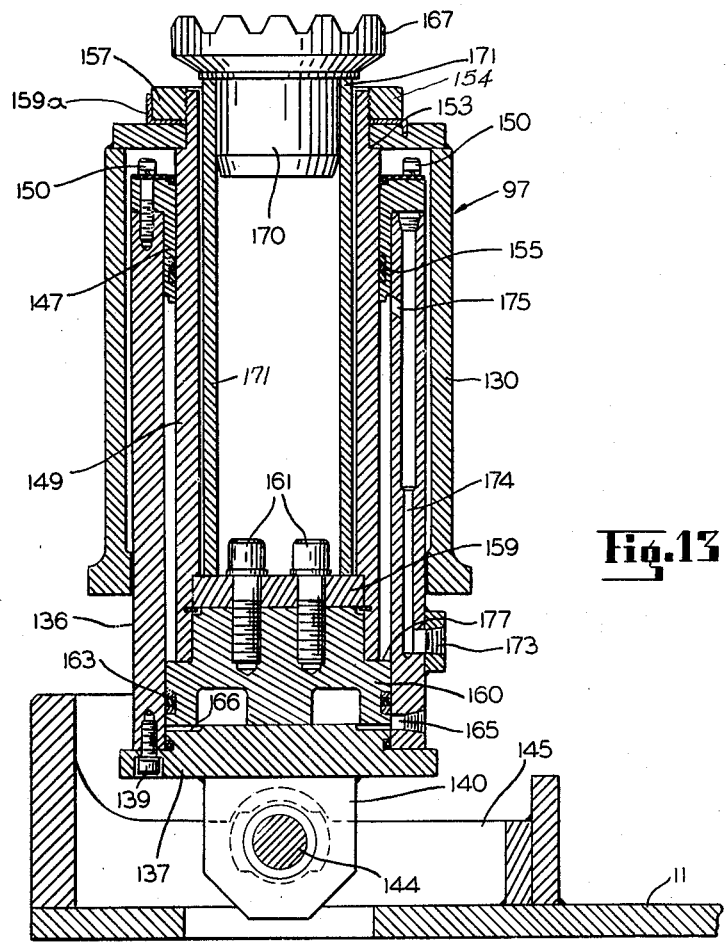
Figure 14:
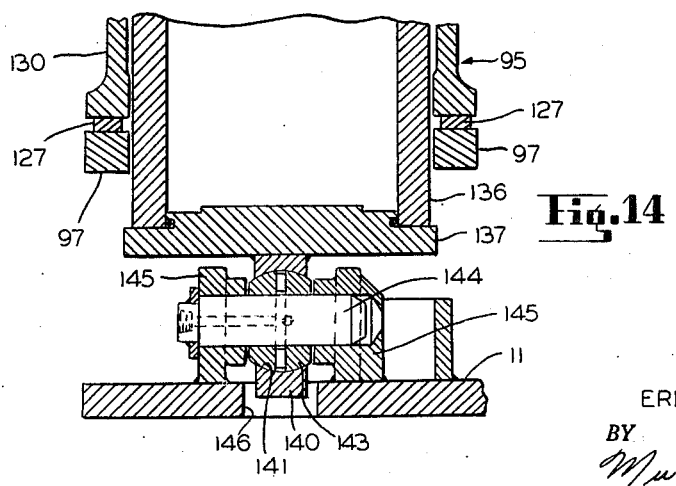

Figure 13 is a sectional view of one of the roof jacks for supporting the base in spaced relation with respect to the ground on the traction tread devices for transportation, and for positively holding the base between the mine roof and floor for loading; and Figure 14 is a transverse sectional view taken through the lower end portion of the jack shown in Figure 13, and showing certain details of the connection between the jack and base, which are not shown in Figure 13.

In the embodiment of my invention illustrated generally in Figures 1 and 2 of the drawings, I have shown a mobile power unit 10 including a base 11 and laterally spaced continuous traction tread devices 12, 12 for propelling the base 11 along the ground. Extending along the top of the power unit 10 and beyond opposite ends thereof is a drive trough 13, reciprocably driven by reciprocating drive mechanism on the mobile power unit, as will hereinafter more clearly appear as this specification proceeds. Arranged in material discharge relation with respect to the drive trough 13 and mounted on the base 11 for lateral swinging movement with respect thereto about a horizontal axis, is an inclined reciprocating feeder trough 15, driven by the mechanism for driving the drive trough 13. The feeder trough 15 has a pick-up trough 16 nested therein and extensibly and retractably moved with respect thereto by friction grip feeding mechanism 17 of a usual construction. A shovel 18 is shown as forming a forward continuation of the pick-up trough 16.

The feeder trough 15 has upright brackets 19, 19 extending upwardly therefrom adjacent the forward end thereof and along opposite sides of the pick-up trough 16 and having the pick-up trough 16 slidably supported thereon as is usual with such troughs. The pick-up trough 16 is in turn supported on the ground for slidable movement therealong on the shovel 18 at its forward end and on a ground engaging shoe 20, having supporting connection with the rear end portion of the pick-up trough 16. The pick-up trough 16, feeding mechanism 17 and shovel 18 are well known to the art and are no part of my present invention, so need not herein be shown or described further.

Pivotally connected to the rear end of the drive trough 13 for movement with respect thereto about a vertical axis through a swivel trough 21, is a shaker conveyor trough line 23 comprising a plurality of connected troughs 24, 24 supported on wheels 25, 25 through support brackets 26, 26.

The trough line 23 is shown as extending beneath a cross main gathering conveyor 27, herein shown as being a troughed belt conveyor. The main gathering conveyor 27 may extend along an entry or through a breakthrough connecting a plurality of rooms together, to gather coal from a number of loading devices working in adjacent rooms, and is no part of my present invention so need not herein be shown or described further.

Nested in the trough line 23 is an inclined transfer trough 29. The transfer trough 29 is shown as being nested within one of the troughs 24 for reciprocal movement therewith. Clamping devices indicated generally by reference character 30 are provided to clamp the side walls of the transfer trough 29 to the adjacent flanges of the trough 24. The transfer trough 29 is shown as being mounted for movement along the troughs 24, on wheels 31 riding along shouldered portions of the side walls of the troughs 24 and supporting the transfer trough in an inclined position in discharge relation with respect to the main gathering conveyor 27.

As the working face is loaded out and as the power unit 10 advances to advance the pick-up trough 16 and shovel 18 on the forward end thereof, the entire trough line 23 may be advanced by the power unit, the power unit pulling the trough line along the ground on the wheels 25, 25. The clamps 30, 30 may be released during advance of the trough line, and the transfer trough 29 moved toward the out-by end of the conveyor into material discharge relation with respect to the main gathering conveyor 27.

The drive trough 13 is shown in Figure 9 as being reciprocably mounted adjacent its rear end on the base 11 on two spaced horizontal rollers 33, 33, journaled on vertical shafts 34, 34 mounted at their upper and lower ends in a support frame 35. The support frame 35 in turn is shown as being mounted on the base 11 in vertically spaced relation with respect thereto on standards 36, 36. The rollers 33, 33 are shown as having generally V-shaped faces engaging corresponding faces in guide tracks 37, 37 extending parallel to the direction of travel of the drive trough 13, and mounted at the lower ends of brackets 39, 39 depending from said drive trough.

The drive trough 13 is shown as being reciprocably mounted adjacent its forward end on spaced horizontal rollers 40, 40 similar to the rollers 33, 33 and journaled in support housings 41, 41 spaced upwardly from the bottom of the base 11 and mounted thereon. The rollers 40, 40 are rotatably mounted on vertical shafts 43 mounted at their opposite ends in the supporting housings 41, 41. The rollers 40, 40 like the rollers 33, 33 have generally V-shaped faces engaging corresponding recessed faces in guide tracks 44, 44 extending along opposite sides of a connecting frame member 45, having supporting connection with the forward end portion of the drive trough 13.

The drive trough 13 is shown as having an outwardly flared receiving end portion 46 within which the feeder trough 15 extends, and is shown as having driving connection with the feeder trough 15 through a drive link 47. The drive link 47 is pivotally connected to the connecting frame 45 at its rear end on a pivot pin 49, and pivotally connected with a reciprocating frame member 50 on a pivot 51. The frame member 50 forms a support for the feeder trough 15 and is reciprocably guided in a swinging or pivoted frame 53 for reciprocable movement with respect thereto on spaced horizontal rollers 54, 54 and 55, 55.

The pivoted frame 53, is shown as having two laterally spaced arms 56, 56 extending forwardly from the base 11 and having rollers 54, 54 mounted thereon adjacent the forward ends thereof. The rollers 54, 54 have supporting engagement with flat guide tracks 57, 57, extending along opposite sides of the support frame 50. The rollers 55, 55 are shown as being mounted at the rear end portions of the arms 56, 56 and as being spaced at a lower level than the rollers 54, 54 for engagement with recessed, V-shaped guide tracks 57a, 57a extending along opposite sides of the rear end portion of the support frame 50.

The swinging or pivoted frame 53 is shown as being mounted on a vertical pivot pin 59 in alignment with the longitudinal center of the base 11 and disposed adjacent the forward end thereof. As herein shown, the pivot pin 59 is mounted in a boss 60 on a spacer frame 61 and has a flange 62 intermediate its ends, secured to the spacer frame 61 as by nuts and bolts 63. The pivot pin 59 is shown in Figure 10 as having the swinging frame 53 journaled thereon on a bearing 64 mounted in a central boss 65 of said swinging frame. The swinging frame is retained from vertical movement along the pivot pin 59 as by a cap 66 bolted or otherwise secured to the top of said pivot pin and extending over the boss 65. The spacer frame 61 also has a bearing member 67 mounted in the upper surface thereof and having slidable engagement with the under surface of a ring sprocket 69 and forming a bearing therefor. The sprocket 69 is recessed within the bottom of the swinging frame 53 and has a chain 70 meshed therewith, for swinging the swinging frame 53, conveyor 15, pick up trough 16 and shovel 18 by power.

The chain 70 is shown as being trained around the rear end portion of the ring sprocket 69 and as extending forwardly from opposite sides thereof around sprockets 71, 71 journaled on the ends of piston rods 73, 73, extensible from cylinders 74, 74. From the sprockets 71, 71 the chain 70 is trained inwardly around abutment members 75, 75 on the forward end portion of the base 11, adjacent opposite sides thereof, and inwardly therefrom to connecting bolts 76, 76 to which the ends of the chain 70 are secured. The connecting bolts 76, 76 are shown as extending through longitudinally extending walls 77, 77 at opposite sides of the base 11. Nuts and springs 78, 78 secured to the ends of the connecting bolts 76, 76 secure the connecting bolts 76, 76 to the walls 77, 77 and form a means for adjusting tension of the chain 70. The cylinders 74, 74 have lugs 79, 79 extending rearwardly from their head ends and pivoted to the base 11 on vertical pivot pins 80, 80. As herein shown, the cylinders 74, 74 and pistons 73, 73 extend from the pivot pins 80, 80 in opposite angular relation with respect to each other so as to exert a pull on the chain 70 tangential to the pitch circle of a sprocket 69.

When fluid under pressure is admitted to the head of one cylinder 74, the swinging frame 53, feeder trough 15 and shovel 18 will be swung in one direction, and when fluid under pressure is admitted to the head end of the opposite cylinder 74, the swinging frame 53, feeder trough 15 and shovel 18 will be swung in an opposite direction, the pull on the chain retracting the opposite piston within its cylinder.

The drive link 47 connecting the frame 45 with the support frame 50 serves to drive the feeder trough 15, pick-up trough 16 and shovel 18 from the drive trough 13 in all positions of lateral swinging movement of the shovel 18 with respect to the drive trough 13.

The drive trough 13 is shown as being reciprocably driven by means of two drive links 83, 83, pivotally connected to forwardly facing drive yokes 84, 84 secured to opposite sides of the trough 13 and extending laterally beyond opposite sides thereof. The drive link 83 on the right hand side of the drive trough 13 when looking toward the forward end of the machine is shown as having pivotal connection with a rocking arm 84 by pivot pin 85. The rocking arm 84 is keyed or otherwise secured to a transverse shaft 86, journaled in a casing 87 for the drive mechanism for the conveyor. The shaft 86, extends transversely beneath the drive trough 13 and has a rocking arm 88 secured to its end opposite from the rocking arm 84. The rocking arm 88 has drive connection with the drive link 83 on the left hand side of the drive trough 13. The rocking arm 84 is shown as having a connecting link 89 pivotally connected thereto by a pivot pin 90. The connecting link 89 is shown as being journaled on a crank 91, journaled in the casing 87, and rotatably driven from a motor 94 mounted on the base 11. The motor 94 serves to rotate the crank 91 through a suitable gear train which is no part of my present invention, so need not herein be shown or described.

The continuous traction tread devices 12, 12 are shown in Figures 11 and 12 as being independent units and support the base for transportation by means of jacks 95, 95 and 96, 96, having direct bearing engagement with cradles 97, 97 and 99, 99 respectively at opposite ends of said traction tread devices.

Each traction tread device 12 is of a similar construction, so one only need herein be shown and described. As herein shown, the traction tread device 12 includes a tread frame 100 having parallel spaced side plates 101, 101 extending therealong and having continuous traction treads 103, 103 trained for movement thereabout. The traction tread 103 is trained about an idler 104 at the rear end of the tread frame 100. The idler 104 is shown as being mounted on a transverse shaft 105. The shaft 105 is adjustably moved along slots 106 in the side plates 101, 101 to take up on the continuous tread 103 by a take-up screw 107. Nuts 109, 109 threaded on opposite ends of said take-up screw abut opposite sides of a transverse frame member 110, connecting the side plates 101, 101 together and serve to lock the shaft 105 in position and to take up on the tread device 103.

A drive sprocket 111 journaled at the forward ends of the side plates 101, 101 serves as a drive sprocket for the traction tread device 103. The drive sprocket 111 is driven from a motor 112 through an endless chain drive 113. The motor 112 may be of any well known form and is herein shown as being a fluid operated motor.

The motor 112 is mounted on the tread frame 100 on an adjustable support 114 spaced above the traction tread device 103 and extending thereacross. The support 114 is shown as being pivoted at one of its ends on upstanding arms 115, 115 projecting upwardly from the side frame members 116, 116 of the cradle 97. A pivot pin 117 mounted in each of said upstanding arms at its ends forms a pivot for the support 114. The support 114 is shown as being held in position and adjustably moved about the pivot pin 117, to take-up tension on the chain 113, as by an adjustable take-up link 119, pivotally connected to an ear 120 projecting forwardly from the inner side of the support 114. The link 119 is pivotally connected to the inner side frame member 116 on a pivot pin 120.

The side frame members 116, 116 are shown as being bolted or otherwise secured to the side plates 101, 101 and as projecting forwardly therefrom beyond the forward ends thereof and the forward end of the continuous traction tread device 103. The cradle 97 is carried between the side frame members 116, 116 at the forward ends thereof and extends downwardly therealong and has a rear vertical wall 123, the inner or forward side of which has slidable engagement with a retaining member 124, extending upwardly from the base 11 (see Figure 10). The cradle 97 is open toward the forward end of the machine and has an arcuate or semi-circular forwardly opening recessed portion 125 extending partially around a cylinder 136 of the jack 95. As herein shown, the cradle 97 has two laterally spaced upwardly facing bearing members 127, 127 at the forward ends thereof. The bearing members 127, 127 have upwardly facing arcuate bearing faces 129, 129, engageable with the lower end portion of a housing member 130 of the jack 95, for rockingly supporting the jack 95 on the forward end portion of the cradle 97 to lift the base 11 above the ground.

The cradle 99 like the cradle 97 is mounted between two side frame members 131, 131 secured to the side plates 101, 101 and projecting rearwardly therefrom in generally parallel relation with respect to each other. The cradle 99 likewise has a rearwardly opening arcuate recess 132 fitting about the room jack 96, and has bearing blocks 133, 133 having supporting engagement with the under surface of a housing member 135 of the jack 96.

The jacks 95 and 96 are of a similar construction so one only need herein be described in detail. The jack 95 is shown in Figures 13 and 14 as being a double acting roof jack having pivotal connection with the base 11. The jacks 95 and 96 may elevate the base above the ground and hold the base 11 in fixed relation with respect to the ground and may lower said base into engagement with the ground, and come into engagement with the mine roof, to hold the base in position on the ground during loading.

The jack 95 is shown in Figure 13 as comprising an outer cylinder 136 movable within the housing 130 and having a head 137 secured to the lower end thereof, as by cap screws 139. A connecting ear 140 is shown as depending from the head 137 and as having a semi-spherical opening therein for rockingly receiving a ball connector 143 mounted on a transverse pivot pin 144. The transverse pivot pin 144 is shown in Figure 12 as being mounted at its ends in spaced lugs or ears 145, 145 extending upwardly from the base 11. The base 11 is shown as having a recessed portion beneath the ear 140, to accommodate pivotal movement of said ear with respect to said base.

The cylinder 136 is shown as having a generally annular flanged sleevelike sealing member 147 secured to its upper end, and having slidable engagement along its inner wall with the outer wall of an inner cylinder 149. The flange of the flanged sealing member 147 is shown as abutting the upper surface of the cylinder 136 and as being secured thereto by machine screws 150, 150. Seals 155 are recessed within the sealing member 147 for engagement with the wall of the inner cylinder 149.

The inner cylinder 149 is shown as having a reduced diameter upper end portion forming a shoulder 153. The shoulder 153 is abutted by an inwardly extending flange 154 of the cylindrical housing 130 and forms a support for said housing. A nut 157 is shown as threaded on the end of the inner cylinder 149 and as being locked in position by a lock washer 159a, for retaining the housing 130 thereto. The inner cylinder 149 is shown as having an internal horizontal closure or wall member 159, secured thereto adjacent its lower end. The closure member abuts the inner end of a piston 160 movable along the cylinder 136 and extending inwardly along the lower end portion of said cylinder for a short part of the length thereof.

The cylinder 160 is secured to the closure member 159 as by cap screws 161 extending through said closure member and threaded within the piston 160. The piston 160 is in turn movable along the inner wall of the cylinder 136, and is shown as being sealed thereto as by a sealing ring 163.

The cylinder 136 is shown as having a port 165 leading through the wall thereof to an annular recess 166 in the upper surface of a head 137. Upon the admission of fluid under pressure to the port 165, the cylinder 136 will move downwardly along the cylinder 149 to engage the base 11 with the ground. As the base 11 is engaged with the ground the continued admission of fluid under pressure through the port 165 will cause the piston 160 to move upwardly within the cylinder 136, and move the inner cylinder 149 upwardly along the outer cylinder 136 to engage a cap member 167 of the jack with the mine roof.

During upward movement of the inner cylinder 149 the housing 130 will be lifted above the bearing blocks 127, 127, so as to relieve the traction tread devices from stresses when holding the base 11 in engagement with the floor.

The engaging member 167 is shown as having a depending boss 170 extending within a cylinder 171, which in turn extends within the inner cylinder 149 and rests on the plate 159.

The cylinder 136 is also shown as having a port 173 leading through the wall thereof in vertically spaced relation with respect to the port 165. The port 173 communicates with a drilled passageway 174 in the wall of the cylinder 136. The drilled passageway 174 is shown as having communication with the interior of the cylinder 136 through a cross passageway 175.

Upon the admission of fluid under pressure through the port 173, fluid will flow in the space between the inner wall of the cylinder 136 and the outer wall of the cylinder 149 and exert pressure on an annular portion 177 of the piston 160, projecting beyond the margin of the cylinder 149. This will return the cylinder 149 within the cylinder 136 and release the cap 167 from the roof. The continued admission of fluid under pressure through the port 173 will then cause the cylinder 136 to move upwardly along the cylinder 149. The simultaneous admission of fluid under pressure to the four ports 173 will thus lift the base 11 above the ground in an obvious manner.

The cylinders 96, 96 at the rear ends of the continuous traction tread devices 12, 12 are like the cylinders 95, 95 and are pivotally connected to the base 11 in the same manner as the cylinders 95 so need not herein be shown or described further.

It may be seen from the foregoing that the laterally spaced continuous traction tread devices 12, 12 are independent units and serve only to transport the base 11 and drive mechanism thereon. It may further be seen that when it is desired to load out a working place as the coal is undercut and broken down, that fluid under pressure is admitted to the hydraulic roof jacks 95, 95 and 96, 96, to first engage said jacks with the ground through the base 11 and then bring the caps 167, 167 thereof into engagement with the mine roof and at the same time disengage the jacks from the continuous traction tread devices 12, 12. The base 11 will then be positively held in a stationary position on the ground, holding the shaker conveyor drive mechanism in a stationary position, to reciprocate the trough line in such a manner as to convey material from the in-by to the out-by end thereof.

Hydraulic fluid under pressure may be supplied to operate the fluid motors 112, 112 and the laterally spaced continuous traction tread devices 12, 12 to engage the roof jacks 95, 95 and 96, 96 with the roof and the base 11 with the ground and to swing the feeder trough 15 and shovel 18 from side to side to pick-up loose material from remote places in the working face, by a motor and pump 180 mounted on the base 11 and suitable valve means (not shown). The pump 180, valves controlling the admission of fluid under pressure to the various hydraulic devices, as well as the fluid pressure conductor from the valves to the hydraulic devices may be of any well known form and need not herein be shown or described since they form no part of my present invention.

The valve means for controlling lateral swinging movement of the feeder trough 15 and shovel 18 may be controlled from a position adjacent the feeding mechanism 17, from either side thereof, by an electrical control (not shown) controlling operation of the central valves therefore (not shown) so as to enable the operator controlling extension of the shovel 18 to swing the shovel to pick-up all of the material from the working space as desired.

It should here be understood that the entire trough line 23 is reciprocably driven through the drive trough 13 on the base 11 at the in-by end of the trough line and that the base 11 feeder trough 15, pick-up trough 16 and shovel 18 may be disposed in various angular relations with respect to the trough line 23 and that the drive trough 13 may drive the trough line 23 through the swivel 21, when so positioned. With this drive arrangement, the shovel 18 may efficiently gather from break-throughs extending from room to room through the ribs of the working place.

It should further be understood that by driving the trough line 23 from its in-by end rather than its out-by end, as is customary, that the trough line may be extended at its out-by end by merely adding troughs thereto as the working face advances, thus saving the time and labor of carrying troughs for extending the conveyor into the working place to a position adjacent the working face.

It may further be seen that the gathering conveyor 27 may remain stationary as the working face advances, the transfer trough 29 loading material thereinto as it is adjusted in position along the trough line 23 as the entire trough line is advanced.

It will be understood that various modifications and variations of the present invention may be effected without departing from the spirit and scope of the novel concepts thereof.

I claim as my invention:

1. In a conveyor loading device, a base, traction devices at each side of said base, a pick-up device extending in advance of said base for picking up loose material from the ground, a motor on said base, mechanism driven by said motor for driving said pick-up device, and hydraulic cylinder and piston devices carried by said traction tread devices and having connection with said base for suspending said base from said traction devices and maintaining said base in an elevated position with respect to the ground for transportation, and engaging said base with the ground and releasing said base from said traction devices for loading.

2. In a conveyor loading device particularly adapted for operation in mines underground a base, laterally spaced continuous traction tread devices extending along each side of said base and having tread frames extending therealong, a conveyor extending along said base, a pick-up device extending in advance of said conveyor for picking up loose material from the ground, a motor on said base, mechanism driven by said motor for driving said conveyor and pick-up device, and oppositely acting fluid operated jacks having bearing engagement with said tread frames and having connection with said base for supporting said base from said continuous traction tread devices and maintaining said base in an elevated position for transportation and operable to engage said base with the ground and movable out of engagement with said tread frames to hold said base in position between the mine roof and floor for loading independently of said tread frames.

3. In a conveyor loading device, a base, two independently driven continuous traction tread devices, one extending along each side of said base, a hydraulic cylinder and piston device having bearing engagement with each continuous traction tread device at each end thereof, a pivotal connection between each hydraulic cylinder and piston device and said base, said cylinder and piston devices being operable to hold said base in an elevated position with respect to the ground by the admission of fluid under pressure to one end thereof and to engage said base with the ground by the admission of fluid under pressure to the opposite ends thereof.

4. In a conveyor loading device, a base, two independently driven continuous traction tread devices, one extending along each side of said base, each of said traction tread devices having a cradle at each end thereof, a hydraulic cylinder and piston device floatingly carried in each of said cradles and having supporting connection with said base for elevating and holding said base in an elevated position with respect to the ground for transportation and for engaging said base with the ground and relieving the weight of said base from said traction tread devices.

5. In a conveyor loading device, a base, laterally spaced continuous traction tread devices extending along each side of said base, each having an individual motor for driving the same and having a cradle at each end thereof, and extending in advance thereof, a fluid operated roof jack adapted to be interposed between a mine roof and bottom and floatingly carried in each of said cradles, each of said roof jacks having pivotal connection with said base and being operable upon the admission of fluid under pressure to one end thereof to elevate said base with respect to the ground and hold said base in an elevated position, and upon the admission of fluid under pressure to an opposite end thereof to first engage said base with the ground and then come out of engagement with said cradles and into engagement with the mine roof.

6. In a conveyor loading device, a base, two independently driven traction tread devices, one extending along each side of said base, said continuous traction tread devices each having a cradle at each end thereof, and spaced in advance thereof, a fluid operated roof jack floatingly carried in each of said cradles and suspended therefrom and having pivotal connection at their lower ends with said base, said jacks being operative upon admission of fluid under pressure to one end thereof to elevate and hold said base in an elevated position with respect to the ground and support said base on said continuous traction tread devices, and upon the admission of fluid under pressure to the opposite end thereof to first engage said base with the ground and to then come into engagement with the mine roof and out of engagement with said traction tread devices, to rigidly hold said base in engagement with the ground.

7. In a conveyor loading device particularly adapted for operation in mines underground, a base, two independently driven continuous traction tread devices, one extending along each side of said base and each having a cradle at each end thereof and opening to opposite ends thereof, a fluid operated roof jack supported in each of said cradles and having engaging connection therewith, each of said roof jacks being double acting and including a cylinder having a piston movable therealong and a second cylinder within said first cylinder and connected with said piston and having a roof engaging cap mounted thereon and having a housing carried by said second cylinder and extending downwardly along said first cylinder and having bearing engagement with an associated cradle, a pivotal connection between the head end of said first cylinder and said base, whereby the admission of fluid under pressure to the one end of said first cylinder will lift said base above the ground and support said base on said traction devices and fluid under pressure to the opposite end of said first cylinder will first engage said base with the ground and then lift said housings above said cradles and engage said caps with the roof.

8. In a conveyor loading device, a base, two independently driven traction tread devices, one extending along each side of said base, each of said traction tread devices having a cradle at each end thereof, a fluid operated roof jack adapted to be interposed between a mine roof and bottom carried by each cradle, each of said cradles having a recessed portion extending around and along opposite sides of an associated jack and having laterally spaced bearing blocks thereon having upwardly facing arcuate engaging faces, each of said roof jacks being double acting and including a cylinder having a piston movable therealong and a second cylinder within said first cylinder and connected with said piston and projecting upwardly from said first cylinder, a pivotal connection between the head end of said first cylinder and said base, and said second cylinder having a housing supported on the upper end thereof and extending downwardly along said first cylinder and having rocking engagement with said bearing blocks, whereby fluid under pressure to one end of said first cylinder will lift said base above the ground and support said base on said traction devices, and fluid under pressure to the opposite end of said first cylinder will first engage said base with the ground and then lift said housing above said bearing blocks and come into engagement with a mine roof.

9. In a conveyor loading device, a base, a continuous traction tread device extending along each side of said base, each traction tread device including a frame having a motor thereon, an endless traction tread guided about said frame, and means driven by said motor for driving said tread about said frame, said frame also having cradles extending in advance of said endless tread at each end thereof, and extensible means floatingly supported on said cradles and having pivotal connection with said base for supporting said base on said tread devices in spaced relation with respect to the ground and for positively engaging said base with the ground for loading.

10. In a conveyor loading device, a base, two independently driven continuous traction tread devices, each extending along one side of said base and including a frame having a motor thereon, an endless traction tread guided about said frame, and means driven by said motor for driving said tread about said frame, said frame also having outwardly opening cradles extending in advance of said endless tread devices at each end thereof, and a hydraulic cylinder and piston having floating engagement with each of said cradles and having pivotal connection with said base, for supporting said base in an elevated position with respect to the ground on said tread devices for transportation, and for positively engaging said base with the ground for loading.

11. In a conveyor loading device particularly adapted for operation in mines underground, a base, a continuous traction tread device extending along each side of said base and each including a frame having a motor thereon, an endless traction tread guided for movement about said frame, and mechanism driven by said motor for driving said tread about said frame, each of said frames also having outwardly opening cradles extending in advance of said endless tread at each end thereof, means supporting said base on said cradles including a roof jack supported in each of said cradles and including a double acting cylinder and piston having pivotal connection with said base to support the same and to engage said base with the ground, and having an engaging cap engageable with a mine roof and having a housing extending downwardly along said cylinder and having engaging connection with an associated cradle and supported thereon.

12. In a shaker conveyor loading device, a base having a trough guided for reciprocable movement therealong, a motor on said base for reciprocably driving said trough, an inclined feeder trough extending forwardly from said trough and reciprocably driven thereby, a pick-up member extending in advance of said feeder trough for picking up loose material from the ground, means holding said base in fixed relation with respect to the ground for loading comprising a plurality of fluid operated roof jacks pivotally connected with said base for engagement with a mine roof, and means having supporting engagement with said roof jacks for supporting said base in spaced relation with respect to the ground for transportation.

13. In a shaker conveyor loading device particularly adapted for operation in mines underground, a base having a drive trough supported and guided for reciprocable movement therealong, a motor on said base for reciprocably driving said trough, a feeder trough in material discharge relation with respect to said drive trough and extending forwardly therefrom, and having a pick-up trough extensibly mounted on the forward end thereof for picking up loose material from the ground, means holding said base in fixed relation with respect to the ground for loading comprising a plurality of fluid operated roof jacks pivotally connected with said base, and engageable with a mine roof, an individually driven laterally spaced continuous traction tread device extending along each side of said base and supporting said jacks to lift and hold said base in spaced relation with respect to the ground for transportation, said jacks engaging said base with the ground and coming into engagement with the mine roof and moving out of engagement with said continuous traction tread devices, when engaging the mine roof.

14. In a shaker conveyor loading device, a base having a trough guided for reciprocable movement therealong, a motor on said base for reciprocably driving said trough, a feeder trough extending in advance of said trough and having a pick-up trough on the forward end thereof for picking up loose material from the ground, means holding said base in fixed relation with respect to the ground for loading comprising a plurality of fluid operated roof jacks pivotally connected with said base for engagement with a mine roof and for engaging said base with the ground, a continuous traction tread device extending along each side of said base, each of said traction tread devices having a cradle spaced in advance of each end thereof, said cradles extending along opposite sides of said jacks and supportingly engaging said jacks, to lift and hold said base in vertically spaced relation with respect to the ground, and to engage said base with the ground and move out of engagement with said cradles when holding the base in fixed relation with respect to the ground.

15. In a shaker conveyor loading device particularly adapted for operation in mines underground, a base having a trough guided for reciprocable movement therealong, a motor on said base for reciprocably driving said trough, a feeder trough mounted on said base in material discharge relation with respect to said trough and for lateral movement with respect to said trough and having a pick-up trough extensibly mounted on the forward end thereof for picking up loose material from the ground, a continuous traction tread device extending along each side of said base, each continuous traction tread device including a frame having a motor thereon, an endless tread guided about said frame, and means driven by said motor for driving said tread about said frame, said frame also having cradles extending in advance of said endless tread at each end thereof, and extensible means supported on said cradles and having connection with said base for supporting said base on said tread devices in spaced relation with respect to the ground for loading.

16. In a shaker conveyor loading device particularly adapted for operation in mines underground, a base having a trough guided for reciprocable movement therealong, a motor on said base for reciprocably driving said trough, a feeder trough mounted on said base in material discharge relation with respect to said trough and reciprocably driven thereby and for lateral movement with respect thereto about a vertical axis, a pick-up trough extending in advance of said feeder trough for picking up loose material from the ground, power means on said base for laterally moving said pick-up and feeders troughs, a continuous traction tread device extending along each side of said base, each tread device including a frame having a motor thereon and an endless tread guided about said frame, means driven by said motor for driving said tread about said frame, said frame also having cradles supported in advance of said endless tread at each end thereof, and double acting fluid operated roof jacks engaging said cradles and floatingly supported thereby and having pivotal connection with said base at one end thereof, for holding said base in an elevated position with respect to the ground for transportation and for positively engaging said base with the ground and holding said base in fixed relation with respect to the ground by engagement with the roof for loading.

17. In a shaker conveyor loading device particularly adapted for operation in mines underground, a base, a drive trough supported on said base for reciprocable movement with respect thereto, a motor on said base for reciprocably driving said trough, a laterally spaced continuous traction tread device extending along each side of said base, hydraulic cylinder and piston devices supported by said traction tread devices and having connection with said base for supporting the same in an elevated position with respect to the ground for transportation and for holding said base in fixed relation with respect to the ground for loading, a feeder trough extending in advance of said base for feeding loose material picked up from the ground to said drive trough, and a conveyor trough line forming a rearward continuation of said drive trough and reciprocably driven thereby, and comprising a plurality of connected wheel supported troughs.

18. In a shaker conveyor loading device particularly adapted for operation in mines underground, a base, a motor on said base, a drive trough supported on said base for reciprocable movement with respect thereto, means driven by said motor for reciprocably driving said trough, a laterally spaced continuous traction tread device extending along each side of said base, hydraulic cylinder and piston devices for supporting said base in an elevated position with respect to the ground for transportation and for engaging said base with the ground for loading, a reciprocable feeder trough extending in advance of said base, a drive connection between said drive trough and feeder trough for driving the same, means supporting said feeder trough on said base in material discharge relation with respect to said drive trough and for lateral movement with respect to said drive trough about a vertical axis, a pick-up trough extensibly mounted with respect to said feeder trough for picking up loose material from the ground and loading it onto said feeder trough, and a reciprocating conveyor trough line forming a rearward continuation of said drive trough and reciprocably driven thereby and comprising a plurality of connected wheel supported troughs movable along the ground.

References Cited in the file of this patent

UNITED STATES PATENTS

| | | |
|---|---|---|
| 1,800,379 | Davis | Apr. 14, 1931 |
| 1,877,286 | Farnham | Sept. 13, 1932 |
| 2,581,356 | Bugos | Jan. 8, 1952 |

FOREIGN PATENTS

| | | |
|---|---|---|
| 683,788 | Great Britain | Dec. 3, 1952 |